US012573321B2

(12) United States Patent
Hsieh et al.

(10) Patent No.: US 12,573,321 B2
(45) Date of Patent: Mar. 10, 2026

(54) ELECTRONIC DEVICE

(71) Applicant: Innolux Corporation, Miaoli County (TW)

(72) Inventors: Hong-Sheng Hsieh, Miaoli County (TW); Chih-Yung Hsieh, Miaoli County (TW); Yan-Zheng Wu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 155 days.

(21) Appl. No.: 18/358,902

(22) Filed: Jul. 25, 2023

(65) Prior Publication Data

US 2024/0071267 A1 Feb. 29, 2024

Related U.S. Application Data

(60) Provisional application No. 63/402,477, filed on Aug. 31, 2022.

(30) Foreign Application Priority Data

Jun. 7, 2023 (CN) ......................... 202310670380.9

(51) Int. Cl.
*G09F 13/10* (2006.01)
*G09F 13/14* (2006.01)

(52) U.S. Cl.
CPC .............. *G09F 13/10* (2013.01); *G09F 13/14* (2013.01)

(58) Field of Classification Search
CPC ................................ G09F 13/10; G09F 13/14
See application file for complete search history.

(56) References Cited

U.S. PATENT DOCUMENTS

| | | | | |
|---|---|---|---|---|
| 2,130,256 | A * | 9/1938 | Wilson | G09F 13/14 359/546 |
| 3,530,462 | A * | 9/1970 | Hampel | G09F 9/307 345/215 |
| 2014/0192515 | A1* | 7/2014 | Kim | G02F 1/133512 362/97.1 |
| 2016/0134008 | A1* | 5/2016 | Kim | H01Q 21/28 343/711 |
| 2016/0190678 | A1* | 6/2016 | Hong | H01Q 1/44 343/700 MS |
| 2022/0359980 | A1* | 11/2022 | Lin | H01Q 1/38 |
| 2022/0416422 | A1* | 12/2022 | Shahvirdi Dizaj Yekan | H01Q 1/3233 |
| 2024/0014538 | A1* | 1/2024 | Park | H01Q 1/52 |
| 2024/0283127 | A1* | 8/2024 | Huang | H01Q 1/1271 |

* cited by examiner

*Primary Examiner* — Gary C Hoge
(74) *Attorney, Agent, or Firm* — JCIPRNET

(57) ABSTRACT

An electronic device is provided. The electronic device includes a first substrate and a first pattern layer. The first substrate has a first surface and a second surface opposite to each other. The first pattern layer is disposed on the first surface and includes a first grid region and a second grid region. The first grid region includes multiple first grids. The second grid region includes multiple second grids. The first grid region is connected to the second grid region. One of the first grid and the second grid includes a metal grid. The other one of the first grid and the second grid includes a non-metal grid. The electronic device of the embodiment of the disclosure can improve appearance.

18 Claims, 8 Drawing Sheets

ELECTRONIC DEVICE

CROSS-REFERENCE TO RELATED APPLICATION

This application claims the priority benefit of U.S. provisional application Ser. No. 63/402,477, filed on Aug. 31, 2022, and China application serial no. 202310670380.9, filed on Jun. 7, 2023. The entirety of each of the above-mentioned patent applications is hereby incorporated by reference herein and made a part of this specification.

BACKGROUND

Technical Field

The disclosure relates to an electronic device, and in particular to an electronic device which can improve appearance.

Description of Related Art

The electronic device or the splicing electronic device has been widely applied to different fields such as communication, display, vehicle, or aviation. With the vigorous development of the electronic device, the electronic device is becoming thinner and lighter, so the requirements for reliability or quality of the electronic device are higher.

SUMMARY

The disclosure provides an electronic device, which can improve appearance. For example, the electronic device can reduce inconsistency in transmittance of different zones or poor appearance due to the emergence of visual dark lines (for example, concentric circle patterns), but not limited thereto.

According to an embodiment of the disclosure, an electronic device includes a first substrate and a first pattern layer. The first substrate has a first surface and a second surface opposite to each other. The first pattern layer is disposed on the first surface and includes a first grid region and a second grid region. The first grid region includes multiple first grids. The second grid region includes multiple second grids. The first grid region is connected to the second grid region. One of the first grid and the second grid includes a metal grid. Other one of the first grid and the second grid includes a non-metal grid.

BRIEF DESCRIPTION OF THE DRAWINGS

The drawings are included to provide a further understanding of the disclosure, and the drawings are incorporated into the specification and constitute a part of the specification. The drawings illustrate embodiments of the disclosure and serve to explain principles of the disclosure together with the description.

DESCRIPTION OF THE EMBODIMENTS

Figure 1A:
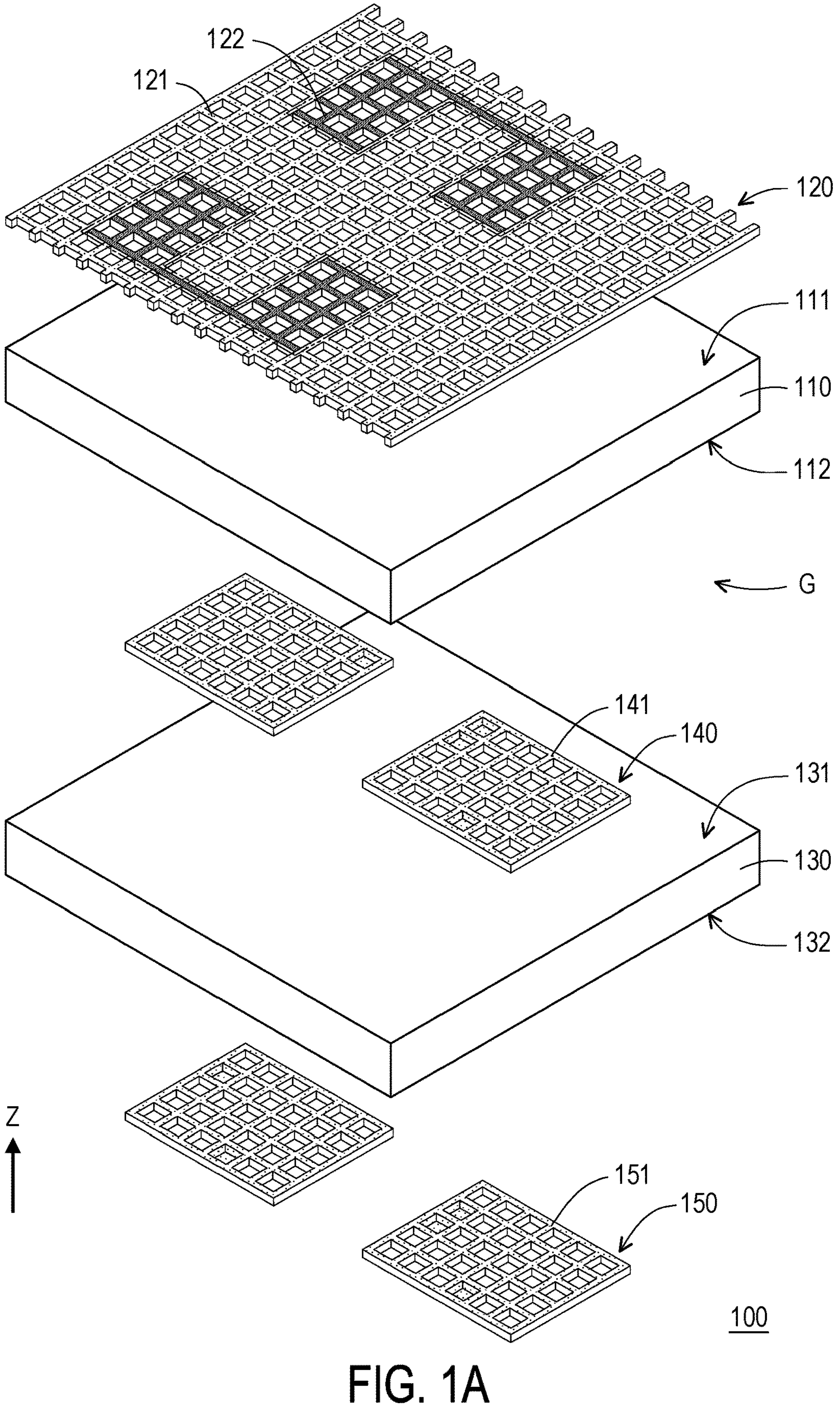
FIG. 1A is a schematic exploded view of an electronic device according to a first embodiment of the disclosure.

The disclosure may be understood with reference to the following detailed description taken in conjunction with the drawings. It should be noted that for the ease of understanding by the reader and the conciseness of the drawings, multiple drawings of the disclosure only depict a part of an electronic device, and specific elements in the drawings may not be drawn according to actual scale. Furthermore, the number and the size of each element in the drawings are illustrative only and are not intended to limit the scope of the disclosure.

In the following specification and claims, terms such as "containing" and "including" are open-ended terms and should thus be interpreted to mean "comprising but not limited to . . . ".

It should be understood that when an element or a film layer is referred to as being "on" or "connected to" another element or film layer, the element or film layer may be directly on the other element or film layer or directly connected to the other element or film layer, or there may be an element or a film layer inserted between the two (case of indirect connection). In contrast, when an element or a film layer is referred to as being "directly on" or "directly connected to" another element or film layer, there is no element or film layer inserted between the two.

Although terms such as "first", "second", and "third" may be used to describe multiple constituent elements, the constituent elements are not limited by the terms. The terms are only used to distinguish a constituent element from other constituent elements in the specification. The claims may not use the same terms, which may be replaced by first, second, third . . . in the order of declaration of the elements in the claims. Therefore, in the following specification, a first constituent element may be a second constituent element in the claims.

In the text, the terms "about", "approximately", "substantially", and "roughly" usually mean within 10%, 5%, 3%, 2%, 1%, or 0.5% of a given value or range. The number given here is an approximate number, that is, in the case where "about", "approximately", "substantially", and "roughly" are not particularly described, the meanings of "about", "approximately", "substantially", and "roughly" may still be implied.

In some embodiments of the disclosure, terms related to bonding and connection such as "connection" and "interconnection", unless otherwise specified, may mean that two structures are in direct contact or may also mean that the two structures are not in direct contact, wherein there is another structure disposed between the two structures. Also, the terms related to bonding and connection may also include the case where the two structures are both movable or the two structures are both fixed. In addition, the term "coupling" includes any direct and indirect electrical connection means.

In some embodiments of the disclosure, an optical microscope (OM), a scanning electron microscope (SEM), a thin film thickness profilometer (α-step), an ellipsometer, or other suitable manners may be used to measure the area, the width, the thickness, or the height of each element or the distance or the spacing between elements. In detail, according to some embodiments, the scanning electron microscope may be used to obtain a cross-sectional structure image including the element to be measured and measure the area, the width, the thickness, or the height of each element or the distance or the spacing between elements.

An electronic device of the disclosure may include a display apparatus, an antenna device, a sensing device, or a splicing device, but not limited thereto. The electronic device may be a bendable or flexible electronic device. The electronic device may, for example, include a liquid crystal light emitting diode. The light emitting diode may, for example, include an organic light emitting diode (OLED), a mini LED, a micro LED, or a quantum dot (QD) LED (which may, for example, be QLED or QDLED), fluorescence, phosphor, other suitable materials, or any permutation and combination of the materials, but not limited thereto. The antenna device may, for example, be a phased array antenna, but not limited thereto. The splicing device may, for example, be a display splicing device or an antenna splicing device, but not limited thereto. It should be noted that the electronic device may be any permutation and combination of the above, but not limited thereto. The content of the disclosure will be described below with the electronic device, but the disclosure is not limited thereto.

It should be noted that in the following embodiments, without departing from the spirit of the disclosure, features in several different embodiments may be replaced, reorganized, and mixed to complete other embodiments. As long as the features of the various embodiments do not violate the spirit of the invention or are not conflicting, the features may be arbitrarily mixed and matched for use.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Figure 1B:
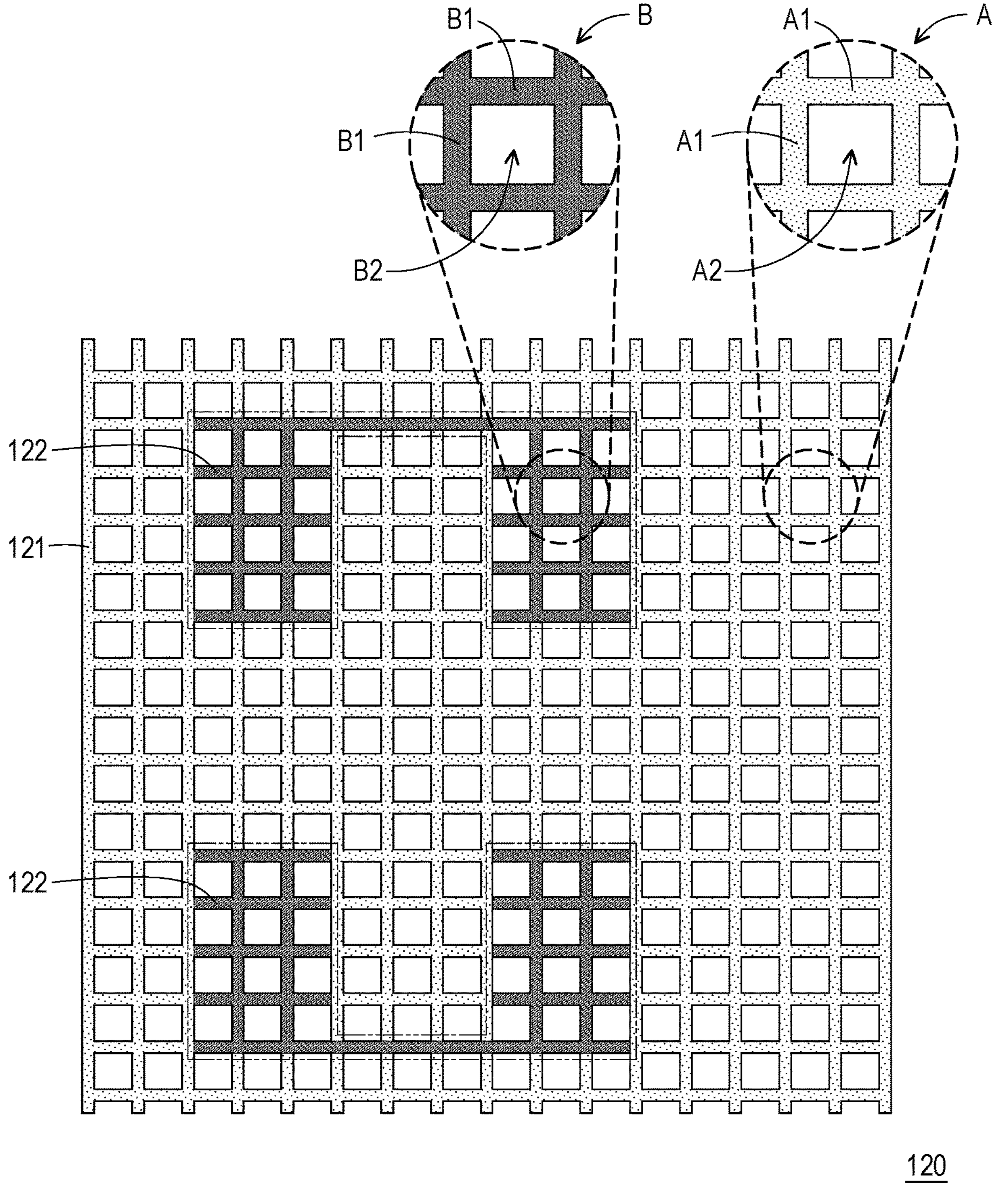
FIG. 1B is a schematic top view of a first pattern layer of the electronic device of FIG. 1A.

FIG. 1A is a schematic exploded view of an electronic device according to a first embodiment of the disclosure. FIG. 1B is a schematic top view of a first pattern layer of the electronic device of FIG. 1A.

Please refer to FIG. 1. An electronic device 100 of the embodiment includes a first substrate 110, a first pattern layer 120, a second substrate 130, a second pattern layer 140, a third pattern layer 150, and an air gap G. The first substrate 110 has a first surface 111 and a second surface 112 opposite to each other. In the embodiment, the material of the first substrate 110 may, for example, be glass or other suitable transparent substrate materials, but not limited thereto.

The first pattern layer 120 is disposed on the first surface 111 of the first substrate 110. The first pattern layer 120 includes a first grid region 121 and a second grid region 122. In a normal direction Z of the first substrate 110, the first grid region 121 is connected to the second grid region 122 to cover or overlap with a part of the first surface 111 of the first substrate 110, but not limited thereto. In some embodiments, the connected first grid region 121 and second grid region 122 may also cover or overlap with the entire first surface 111 of the first substrate 110 in the normal direction Z of the first substrate 110.

Specifically, the first grid region 121 has multiple first grids A connected together. The first grid A has multiple grid lines A1 and a through region A2. The grid lines A1 may be connected together to surround the through region A2. The through region A2 may run through the first pattern layer 120 and expose the first surface 111 of the first substrate 110. Additionally, the second grid region 122 has multiple second grids B connected together. The second grid B has multiple grid lines B1 and a through region B2. The grid lines B1 may be connected together to surround the through region B2. The through region B2 may run through the first pattern layer 120 and expose the first surface 111 of the first substrate 110.

In the embodiment, the shapes of the first grid A and the second grid B may, for example, be hollow rectangles formed by crossing four grid lines, but not limited thereto. In some embodiments, the shapes of the first grid and the second grid may also be hollow triangles formed by crossing three grid lines, hollow hexagons formed by crossing six grid lines, or hollow polygons formed by crossing other numbers of grid lines.

In the embodiment, since the line width of the grid line A1 constituting the first grid A may be substantially the same as (or similar to) the line width of the grid line B1 constituting the second grid B, and the shape, the area, and the reflectivity of the first grid A may be substantially the same as (or similar to) the shape, the area, and the reflectivity of the second grid B, the transmittance of the first grid A may be substantially the same as (or similar to) the transmittance of the second grid B. In some embodiments, the difference between the transmittance of the first grid A and the transmittance of the second grid B may be, for example, less than 5%, but not limited thereto. The transmittance may be obtained by respectively simulating the materials, the shapes, the areas, etc. of the first grid and the second grid or obtained from actual measurements.

In the embodiment, the material of the first grid A in the first grid region 121 may be an opaque and low loss tangent (DO non-metal material, so that the first grid A may be a non-metal grid, but not limited thereto. The material of the second grid B in the second grid region 122 may be an opaque metal material, so that the second grid B may be a metal grid, but not limited thereto. For example, the material of the second grid B may include copper, aluminum, silver, an alloy of the above materials, or other opaque conductive materials. In other embodiments, the material of the first grid A in the first grid region 121 may be an opaque metal material, so that the first grid A may be a metal grid, and the material of the second grid B may be an opaque and low loss tangent non-metal material, so that second grid B may be a non-metal grid. In some embodiments, the material of the second grid B in the second grid region 122 may be an opaque metal grid covered on a low loss tangent non-metal grid. In the embodiment, a method of forming the first pattern layer is to first form a low loss tangent material on the first substrate, then pattern the same to form a grid shape, then form an opaque metal layer on the low loss tangent grid, and pattern the opaque metal layer to form a grid located on a part of the non-metal grid. In addition, compared to a conventional electronic device that has poor appearance such as dark lines (for example, concentric circle patterns) due to a first pattern layer having only one grid region, the electronic device 100 of the embodiment can reduce poor appearance such as dark lines (for example, concentric circle patterns) through the design of the first pattern layer 120 including the first grid region 121 and the second grid region

122 connected to each other, thereby improving the appearance of the electronic device 100.

The second substrate 130 is disposed opposite to the first substrate 110. The second substrate 130 has a third surface 131 and a fourth surface 132 opposite to each other, and the third surface 131 faces the second surface 112. In the embodiment, the material of the second substrate 130 may, for example, be glass or other suitable transparent substrate materials, but not limited thereto.

The second pattern layer 140 is disposed on the third surface 131 of the second substrate 130. The second pattern layer 140 has a grid region 141, and the grid region 141 may cover a part of the third surface 131 of the second substrate 130, but not limited thereto. In other words, the grid region 141 of the second pattern layer 140 does not completely cover the third surface 131 of the second substrate 130.

The third pattern layer 150 is disposed on the fourth surface 132 of the second substrate 130. The third pattern layer 150 has a grid region 151, and the grid region 151 may cover a part of the fourth surface 132 of the second substrate 130, but not limited thereto. In other words, the grid region 151 of the third pattern layer 150 does not completely cover the fourth surface 132 of the second substrate 130.

The air gap G is disposed between the second surface 112 of the first substrate 110 and the second pattern layer 140. In other words, the second surface 112 of the first substrate 110 does not contact the second pattern layer 140.

The electronic device 100 of the embodiment may be applied to an antenna device or a transparent antenna device to be used to collect signals, amplify signals, and/or transmit signals.

In the embodiment, the first pattern layer 120 is exemplarily designed as a full-surface grid to improve the inconsistency of transmittance of the full surface or reduce visual dark lines (for example, concentric circle patterns), but not limited thereto. In some embodiments, at least one, at least two, or all of the first pattern layer, the second pattern layer, and the third pattern layer may also be designed as full-surface grids, so as to reduce visual dark lines (for example, concentric circle patterns), thereby improving the appearance.

In the electronic device 100 of the embodiment, 2 substrates and 3 pattern layers are schematically shown, but the disclosure does not limit the number of substrates and pattern layers in the electronic device. In some embodiments, other number of substrates and/or pattern layers may be disposed between the first substrate 110 and the second substrate 130 of the electronic device 100 according to actual requirements or designs.

In the electronic device 100 of the embodiment, although the second grid B of the second grid region 122 is manufactured by using an opaque metal material to provide the purpose of signal transmission, the disclosure is not limited thereto. In some unshown embodiments, the second grid of the second grid region may also use a non-metal material, and a fourth pattern layer used for signal transmission may be additionally manufactured by using an opaque metal material, wherein the fourth pattern layer is disposed on the third pattern layer, and the fourth pattern layer has a third grid region that may overlap with the corresponding second grid region.

Other embodiments are listed below for illustration. It must be noted here that the following embodiments continue to use the reference numerals and some content of the foregoing embodiment, wherein the same reference numerals are adopted to represent the same or similar elements, and the description of the same technical contents is omitted. For the description of the omitted part, reference may be made to the foregoing embodiment, which will not be repeated in the following embodiments.

Figure 2:
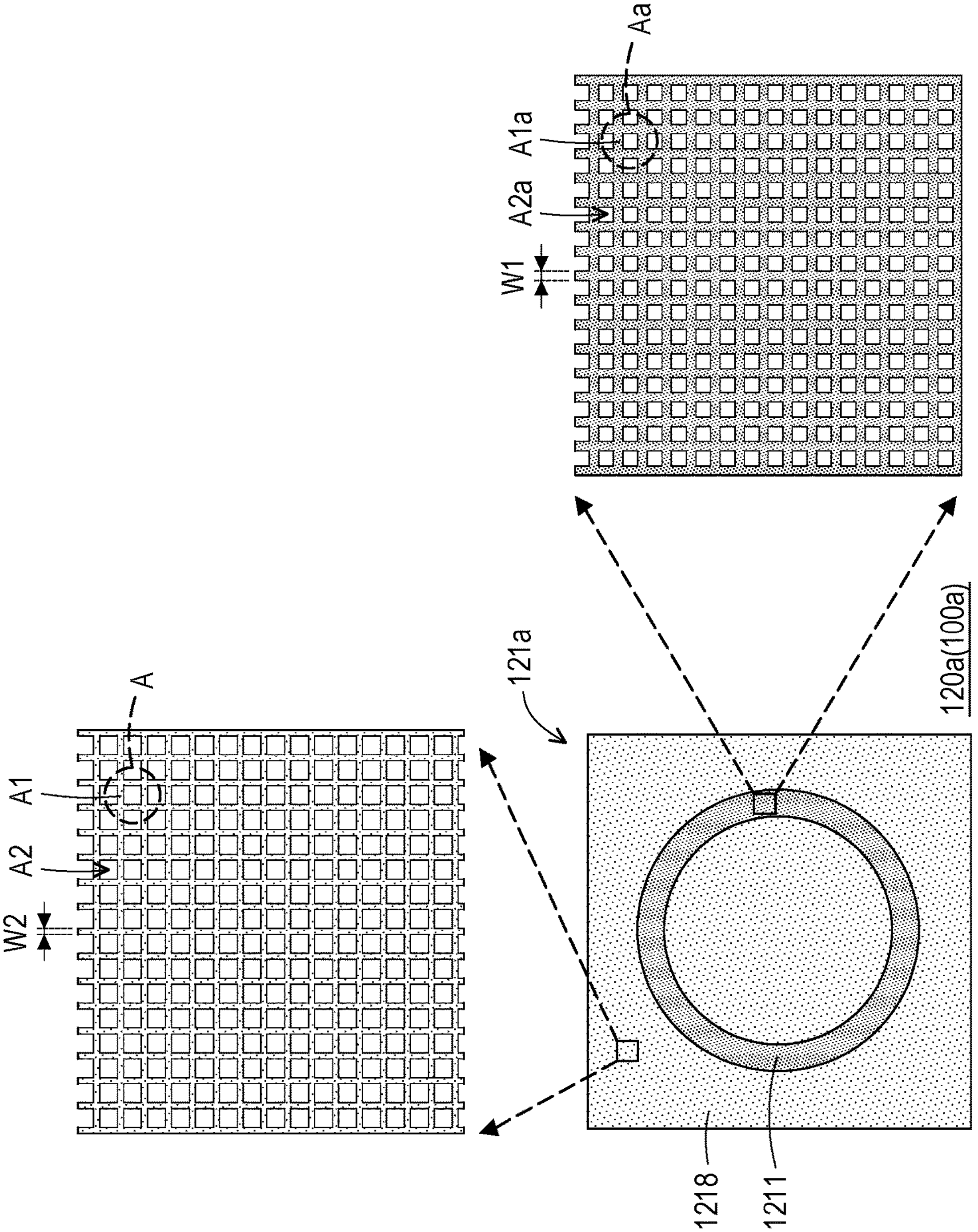
FIG. 2 is a schematic partial top view of a first pattern layer of an electronic device according to a second embodiment of the disclosure.

FIG. 2 is a schematic partial top view of a first pattern layer of an electronic device according to a second embodiment of the disclosure. Please refer to FIG. 1B and FIG. 2 at the same time. An electronic device 100*a* of the embodiment is similar to the electronic device 100 in FIG. 1B, but the differences between the two are that in a first pattern layer 120*a* of the electronic device 100*a* of the embodiment, a first grid region 121*a* may include a first region 1211 and a second region 1218, and the transmittance of the first region 1211 may be different from the transmittance of the second region 1218.

Specifically, please refer to FIG. 2. In the embodiment, since a line width W1 of a grid line A1*a* of a first grid Aa in the first region 1211 may be greater than a line width W2 of a grid line A1 of the first grid A in the second region 1218, the area of a through region A2*a* of the first grid Aa is less than the area of the through region A2 of the first grid A, so that the transmittance of the first region 1211 is less than the transmittance of the second region 1218 (or the brightness of the first region 1211 is less than the brightness of the second region 1218). With such design, a circular pattern of the first region 1211 of the first grid region 121*a* of the first pattern layer 120*a* can be presented, and the appearance of the electronic device 100*a* can be richer and not monotonous.

Although the electronic device 100*a* of the embodiment exemplarily adjusts the transmittance (or the brightness) of different zones and enriches the pattern of the first pattern layer 120*a* through adjusting the line widths of the grid lines of different zones in the first grid region 121*a*, the disclosure is not limited thereto. In some embodiments, the transmittance (or the brightness) of different zones may also be adjusted through adjusting the line widths of the grid lines of different zones in the second grid region 122 (or the first grid region 121*a* and the second grid region 122 at the same time), thereby enriching the pattern of the first pattern layer.

In the electronic device 100*a* of the embodiment, although the pattern of the first region 1211 is the circular pattern, the disclosure does not limit the pattern of the first region 1211. In other words, in some embodiments, the pattern of the first region 1211 may also be other regular or irregular patterns, as long as the transmittance or the brightness of the first region 1211 is less than the transmittance or the brightness of the second region 1218, and the pattern of the first region 1211 can be presented.

Figure 3:
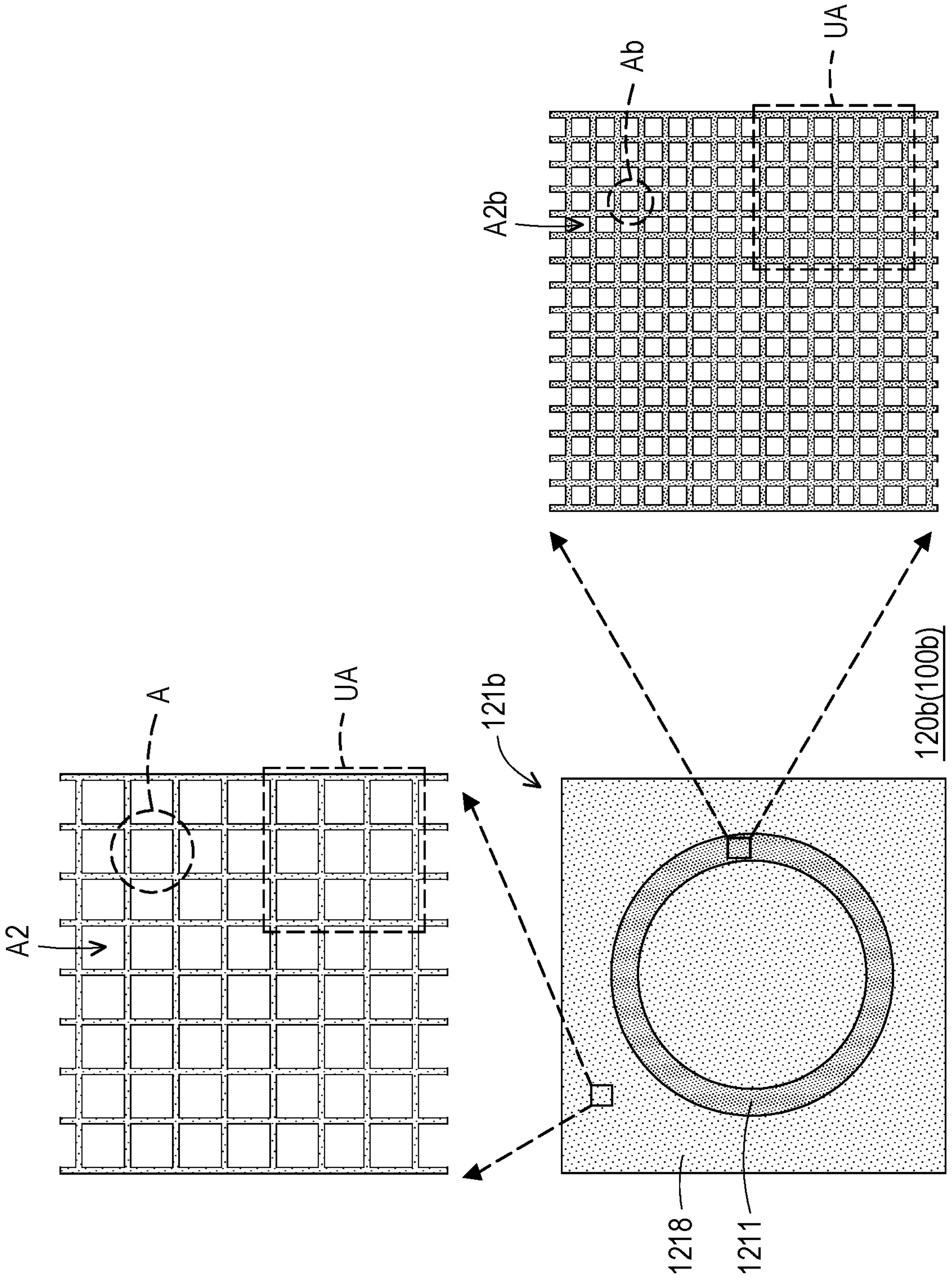
FIG. 3 is a schematic partial top view of a first pattern layer of an electronic device according to a third embodiment of the disclosure.

FIG. 3 is a schematic partial top view of a first pattern layer of an electronic device according to a third embodiment of the disclosure. Please refer to FIG. 1B and FIG. 3 at the same time. An electronic device 100*b* of the embodiment is similar to the electronic device 100 in FIG. 1B, but the differences between the two are that in a first pattern layer 120*b* of the electronic device 100*b* of the embodiment, a first grid region 121*b* may include the first region 1211 and the second region 1218, and the transmittance of the first region 1211 is different from the transmittance of the second region 1218.

Specifically, please refer to FIG. 3. In the embodiment, since the area enclosed by the outline of a first grid Ab in the first region 1211 may be less than the area enclosed by the outline of the first grid A in the second region 1218 (or the number of the first grids Ab in the first region 1211 may be greater than the number of the first grids A in the second region 1218 in an unit area UA of the same size), the area of a through region A2*b* of the first grid Ab is less than the area of the through region A2 of the first grid A, so that the transmittance of the first region 1211 is less than the transmittance of the second region 1218 (or the brightness of the first region 1211 is less than the brightness of the second region 1218). With such design, a circular pattern of the first region 1211 of the first grid region 121*b* of the first pattern layer 120*b* can be presented, and the appearance of the electronic device 100*b* can be richer and not monotonous.

Although the electronic device 100*b* of the embodiment exemplarily adjusts the transmittance (or the brightness) of different zones and enriches the pattern of the first pattern layer 120*b* through adjusting the areas enclosed by the outlines of the grids of different zones in the first grid region 121*b*, the disclosure is not limited thereto. In some embodiments, the transmittance of different zones may also be adjusted through adjusting the areas enclosed by the outlines of the grids of different zones in the second grid region 122 (or the first grid region 121*b* and the second grid region 122 at the same time), thereby enriching the pattern of the first pattern layer.

In the electronic device 100*b* of the embodiment, although the pattern of the first region 1211 is a circular pattern, the disclosure does not limit the pattern of the first region 1211. In other words, in some embodiments, the pattern of the first region 1211 may also be other regular or irregular patterns, as long as the transmittance or the brightness of the first region 1211 is less than the transmittance or the brightness of the second region 1218, and the pattern of the first region 1211 can be presented.

Figure 4:
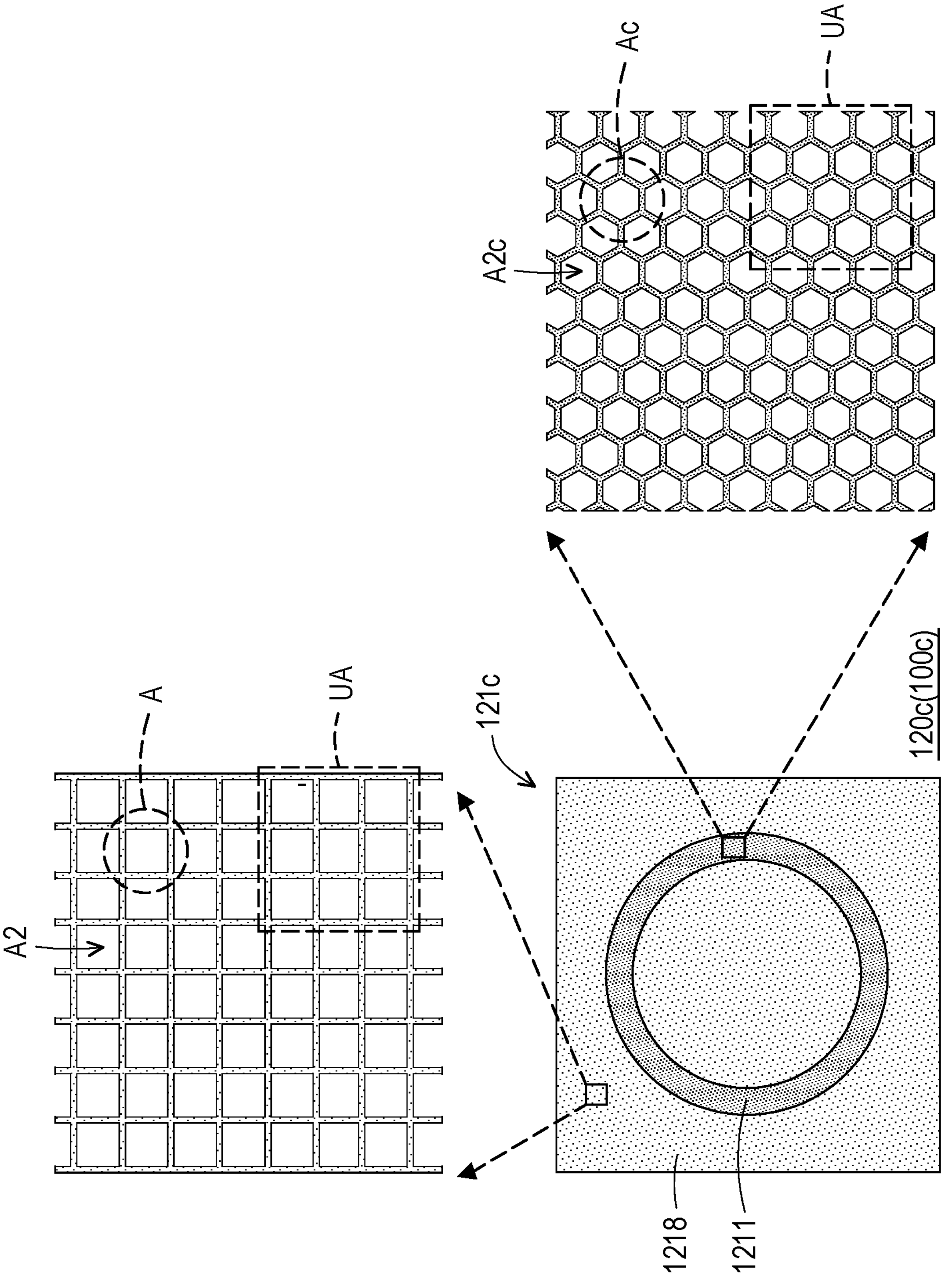
FIG. 4 is a schematic partial top view of a first pattern layer of an electronic device according to a fourth embodiment of the disclosure.

FIG. 4 is a schematic partial top view of a first pattern layer of an electronic device according to a fourth embodiment of the disclosure. Please refer to FIG. 1B and FIG. 4 at the same time. An electronic device 100*c* of the embodiment is similar to the electronic device 100 in FIG. 1B, but the differences between the two are that in a first pattern layer 120*c* of the electronic device 100*c* of the embodiment, a first grid region 121*c* may include the first region 1211 and the second region 1218, and the transmittance of the first region 1211 is different from the transmittance of the second region 1218.

Specifically, please refer to FIG. 4. In the embodiment, the shape of a first grid Ac in the first region 1211 is a hollow hexagon, and the shape of the first grid A in the second region 1218 is a hollow quadrilateral.

In the embodiment, since the shape of the first grid Ac in the first region 1211 is different from the shape of the first grid A in the second region 1218, and the area of a through region A2*c* of the first grid Ac is less than the area of the through region A2 of the first grid A (or the number of the first grids Ac in the first region 1211 is greater than the number of the first grids A in the second region 1218 in the unit area UA of the same size), the transmittance of the first region 1211 is less than the transmittance of the second region 1218 (or the brightness of the first region 1211 is less than the brightness of the second region 1218). With such design, a circular pattern of the first region 1211 of the first grid region 121*c* of the first pattern layer 120*c* can be presented, and the appearance of the electronic device 100*c* can be richer and not monotonous.

Although the electronic device 100*c* of the embodiment exemplarily adjusts the transmittance (or the brightness) of different zones and enriches the pattern of the first pattern layer 120*c* through adjusting the shapes of the grids of different zones in the first grid region 121*c*, the disclosure is not limited thereto. In some embodiments, the transmittance of different zones may also be adjusted through adjusting the shapes of the grids of different zones in the second grid region 122 (or the first grid region 121*c* and the second grid region 122 at the same time), thereby enriching the pattern of the first pattern layer.

In the electronic device 100*c* of the embodiment, although the pattern of the first region 1211 is the circular pattern, the disclosure does not limit the pattern of the first region 1211. In other words, in some embodiments, the pattern of the first region 1211 may also be other regular or irregular patterns, as long as the transmittance or the brightness of the first region 1211 may be less than the transmittance or the brightness of the second region 1218, and the pattern of the first region 1211 can be presented.

Figure 5A:
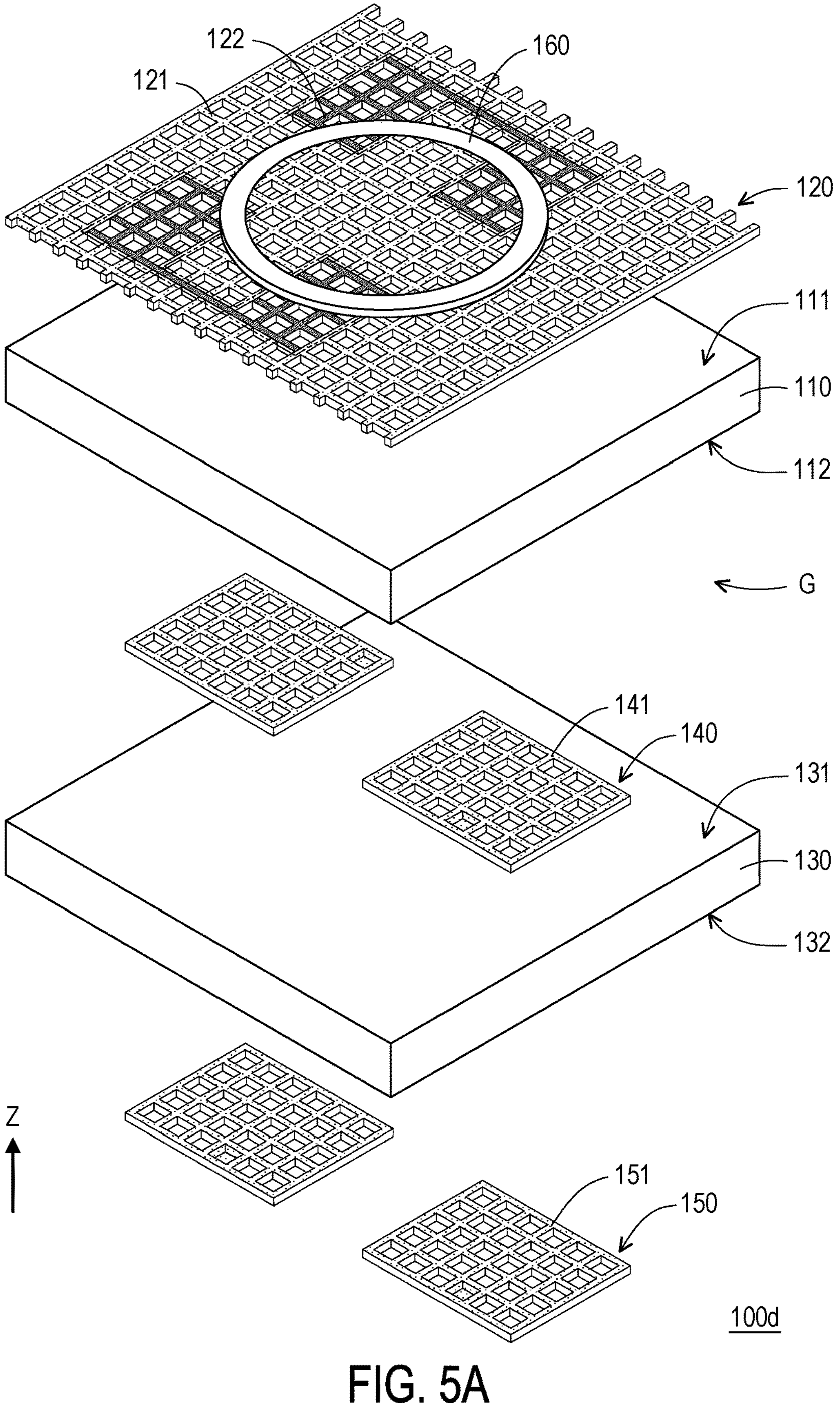
FIG. 5A is a schematic exploded view of an electronic device according to a fifth embodiment of the disclosure.
Figure 5B:
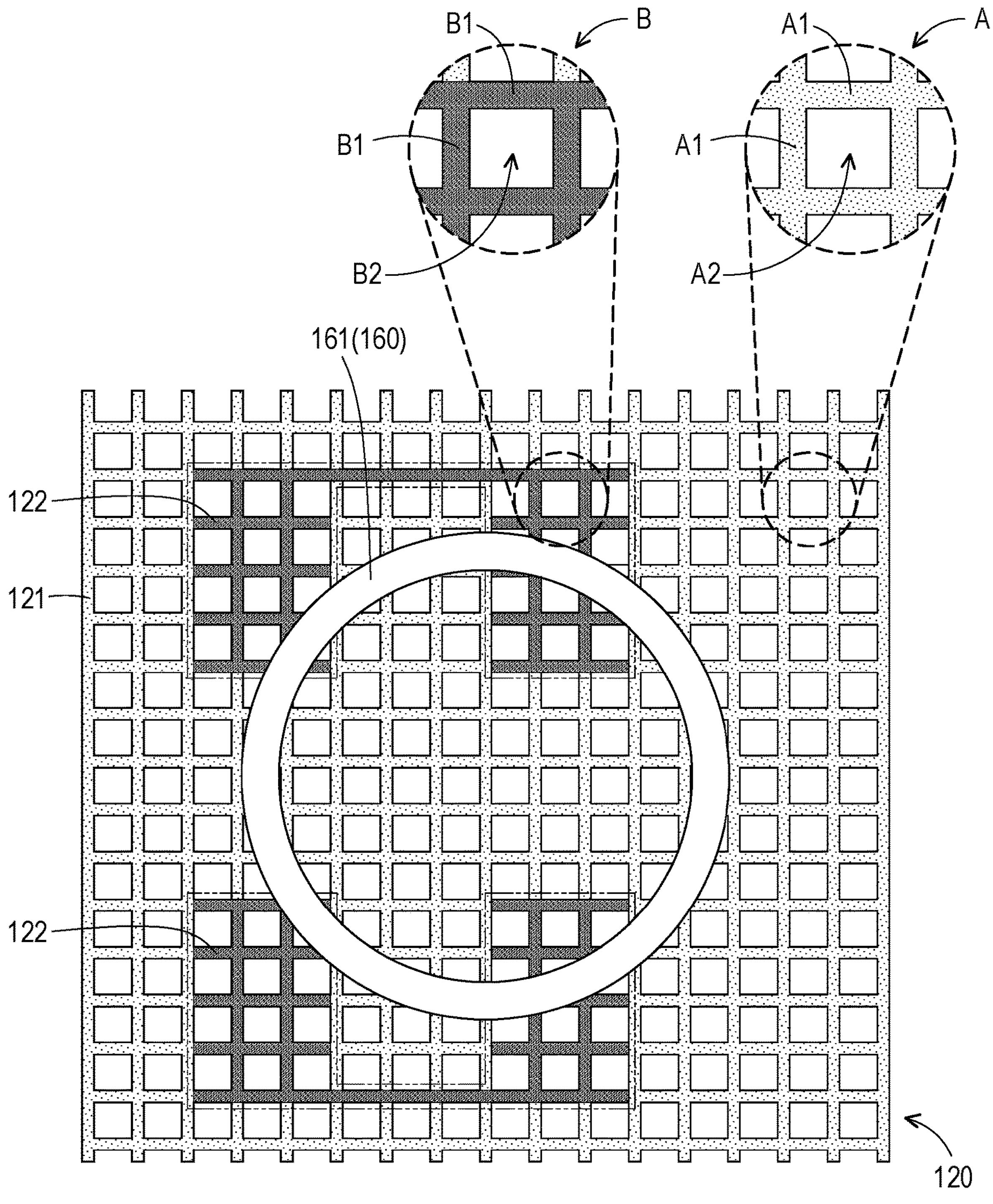
FIG. 5B is a schematic top view of a first pattern layer and a fourth pattern layer of the electronic device of FIG. 5A.

FIG. 5A is a schematic exploded view of an electronic device according to a fifth embodiment of the disclosure. FIG. 5B is a schematic top view of a first pattern layer and a fourth pattern layer of the electronic device of FIG. 5A. Please refer to FIG. 1A and FIG. 1B and FIG. 5A and FIG. 5B at the same time. An electronic device 100*d* of the embodiment is similar to the electronic device 100 in FIG. 1A and FIG. 1B, but the difference between the two is that the electronic device 100*d* of the embodiment further includes a fourth pattern layer 160.

Specifically, please refer to FIG. 5A and FIG. 5B. In the embodiment, the fourth pattern layer 160 is disposed on the first pattern layer 120, and the fourth pattern layer 160 may cover (or overlap with) a part of the first pattern layer 120 in the normal direction Z of the first substrate 110. The fourth pattern layer 160 includes a third grid region 161, and the third grid region 161 may overlap with corresponding parts of the first grid region 121 and the second grid region 122. The third grid region 161 has multiple third grid (not shown) connected together, and the third grid has multiple grid lines and a through region.

In the embodiment, in order to present a circular pattern of the third grid region 161, so that the appearance of the electronic device 100*d* can be richer and not monotonous, the transmittance of the third grid region 161 may be made less than the transmittance of the first grid region 121 by, for example, adopting a manner similar to the manner of FIG. 2, FIG. 3, and/or FIG. 4, but not limited thereto. For example, the line width of the grid line of the third grid in the third grid region 161 is made less than the line width of the grid line A1 of the first grid A in the first grid region 121, the area enclosed by the outline of the third grid in the third grid region 161 is made less than the area enclosed by the outline of the first grid A in the first grid region 121, or the shape of the third grid in the third grid region 161 is made different from the shape of the first grid A in the first grid region 121, and the area of the through region of the third grid is made less than the area of the through region A2 of the first grid A.

In some embodiments, through changing the reflection characteristics of the third grid of the third grid region 161, the reflectivity of the third grid region 161 may be less than the reflectivity of the first grid region 121, and the circular pattern of the third grid region 161 can also be presented, so that the appearance of the electronic device 100*d* can be richer and not monotonous. The reflectivity may be obtained by respectively simulating the materials, the shapes, and the areas of the first grid and the second grid or obtained from actual measurements.

In the electronic device 100*d* of the embodiment, although the pattern of the third grid region 161 is the circular pattern, the disclosure does not limit the pattern of the third grid region 161. In other words, in some embodiments, the pattern of the third grid region 161 may also be other regular or irregular patterns, as long as the transmittance, the brightness, or the reflectivity of the third grid region 161 may be less than the transmittance, the brightness, or the reflectivity of the second region 1218, and the pattern of the third grid region 161 can be presented.

Figure 6:
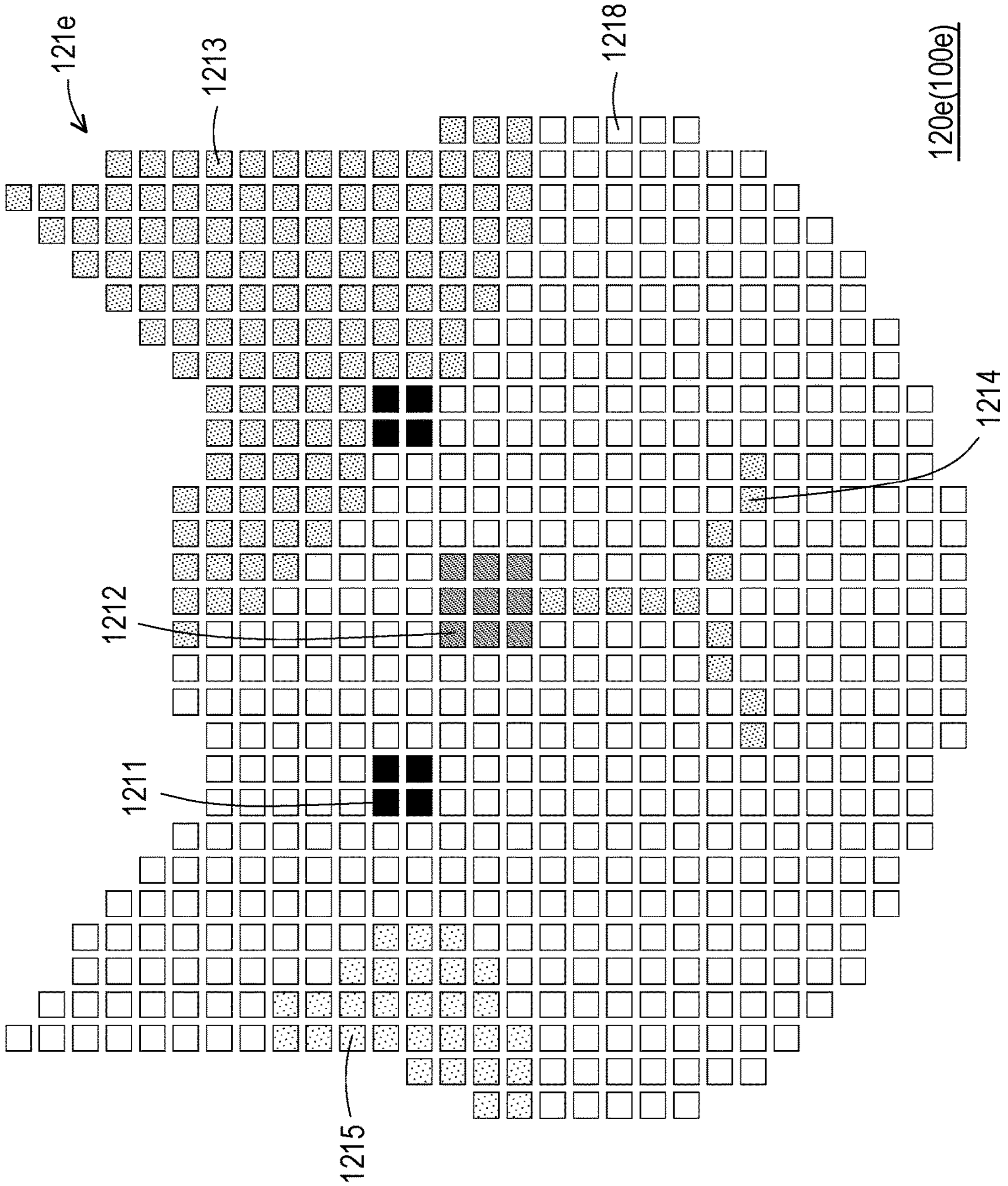
FIG. 6 is a partial top view of a first pattern layer of an electronic device according to a sixth embodiment of the disclosure.

FIG. 6 is a partial top view of a first pattern layer of an electronic device according to a sixth embodiment of the disclosure. Please refer to FIG. 1B and FIG. 6 at the same time. An electronic device 100*e* of the embodiment is similar to the electronic device 100 in FIG. 1B, but the difference between the two is that in a first pattern layer 120*e* of the electronic device 100*e*, a first grid region 121*e* may include the first region 1211, a third region 1212, a fourth region 1213, a fifth region 1214, a sixth region 1215, and the second region 1218.

Specifically, please refer to FIG. 6. In the embodiment, the first grid region 121*e* may be exemplarily designed to present a pattern of a face of a cat, but not limited thereto. The first region 1211 may present the eyes of the cat, the third region 1212 may present the nose of the cat, the fourth region 1213 may present the left ear of the cat, the fifth region 1214 may present the mouth of the cat, the sixth region 1215 may present a patch adjacent to the right ear of the cat, and the second region 1218 may present the remaining part of the face of the cat.

In the embodiment, the transmittance of the first region 1211, the third region 1212, the fourth region 1213, the fifth region 1214, and the sixth region 1215 may be changed by, for example, adopting a manner similar to the manner of FIG. 2, FIG. 3, FIG. 4, or a combination thereof, so that the first region 1211, the third region 1212, the fourth region 1213, the fifth region 1214, the sixth region 1215, and the second region 1218 may respectively have different transmittance or brightness, such that the patterns of the first region 1211, the third region 1212, the fourth region 1213, the fifth region 1214, the sixth region 1215, and the second region 1218 can be presented, and the first grid region 121*e* of the first pattern layer 120*e* of the electronic device 100*e* can present the pattern of the face of the cat.

In some embodiments, in addition to changing the transmittance of different zones in the first grid region 121*e*, the reflectivity (or the brightness) of different zones may also be changed through changing the reflection characteristics of different zones at the same time, so that the patterns of different zones can be presented.

In summary, in the electronic device of the embodiments of the disclosure, poor appearance such as dark lines (for example, concentric circle patterns) can be reduced through the design of the first pattern layer including the first grid region and the second grid region connected to each other, thereby improving the appearance of the electronic device. In the electronic device of some embodiments, the transmittance (or the brightness) of different zones may be adjusted through adjusting the line widths of the grid lines of the grids (or the areas enclosed by the outlines of the grids or the shapes of the grids) of different zones in the grid regions (for example, the first grid region and/or the second grid region) of the first pattern layer, or the reflectivity (or the brightness) of different zones may be adjusted through adjusting the reflection characteristics of different zones in the grid regions (for example, the first grid region and/or the second grid region) of the first pattern layer, so that the patterns of different zones can be presented, such that the appearance of the electronic device can be richer and not monotonous.

Finally, it should be noted that: the above embodiments are only used to illustrate the technical solution of the disclosure, not to limit it; although the disclosure has been described in detail with reference to the above-mentioned embodiments, those skilled in the art should understand that the technical solutions described in the above-mentioned embodiments may still be modified, or some or all of the technical features may be equivalently replaced; however, these modifications or replacements do not make the essence of the corresponding technical solutions depart from the scope of the technical solutions of the embodiments of the disclosure.

What is claimed is:

1. An electronic device, comprising:

a first substrate, having a first surface and a second surface opposite to each other; and a first pattern layer, disposed on the first surface and comprising a first grid region and a second grid region, wherein the first grid region comprises a plurality of first grids, and the second grid region comprises a plurality of second grids;

the first grid region is connected to the second grid region, one of the first grid and the second grid comprises a metal grid, and other one of the first grid and the second grid comprises a non-metal grid, wherein a difference between a transmittance of the first grids and a transmittance of the second grids is less than 5%.

2. The electronic device according to claim 1, wherein the first grid region comprises a first region and a second region, and a line width of a first grid in the first region is greater than a line width of a first grid in the second region.

3. The electronic device according to claim 1, wherein the first grid region comprises a first region and a second region, and an area enclosed by an outline of a first grid in the first region is less than an area enclosed by an outline of a first grid in the second region.

4. The electronic device according to claim 3, wherein in a unit area of a same size, a number of the first grid in the first region is greater than a number of the first grid in the second region.

5. The electronic device according to claim 1, wherein the first grid region comprises a first region and a second region, and a shape of a first grid in the first region is different from a shape of a first grid in the second region.

6. The electronic device according to claim 5, wherein in a unit area of a same size, a number of the first grid in the first region is greater than a number of the first grid in the second region.

7. The electronic device according to claim 1, wherein the first grid region comprises a first region and a second region, and a transmittance of the first region is different from a transmittance of the second region.

8. The electronic device according to claim 7, wherein the transmittance of the first region is less than the transmittance of the second region.

9. The electronic device according to claim 1, wherein the first grid region comprises a first region and a second region, and a reflectivity of a first grid in the first region is less than a reflectivity of a first grid in the second region.

10. The electronic device according to claim 1, wherein the first grid region comprises a first region and a second region, and a brightness of the first region is less than a brightness of the second region.

11. The electronic device according to claim 1, further comprising:

a second substrate, having a third surface and a fourth surface opposite to each other, wherein the third surface faces the second surface;

a second pattern layer, disposed on the third surface;

a third pattern layer, disposed on the fourth surface; and an air gap, disposed between the second surface and the second pattern layer.

12. The electronic device according to claim 11, further comprising:

a fourth pattern layer, disposed on the first pattern layer and comprising a third grid region, wherein the third grid region overlaps with a part of the first grid region.

13. The electronic device according to claim 12, wherein a transmittance of the third grid region is less than a transmittance of the first grid region.

14. The electronic device according to claim 12, wherein a reflectivity of the third grid region is less than a reflectivity of the first grid region.

15. The electronic device according to claim 1, wherein the first pattern layer covers the entire first surface of the first substrate.

16. The electronic device according to claim 1, wherein each of the first grids has a plurality of grid lines and a through region, and the grid lines are connected together to surround the through region.

17. The electronic device according to claim 1, wherein a material of the metal grid is an opaque metal material.

18. The electronic device according to claim 1, wherein a material of the non-metal grid is an opaque and low loss tangent non-metal material.

* * * * *